US012752710B2

(12) United States Patent
Vishwakarma et al.

(10) Patent No.: US 12,752,710 B2
(45) Date of Patent: Oct. 6, 2026

(54) DEPLOYABLE STEP ASSEMBLY FOR AN AGRICULTURAL UTILITY VEHICLE

(71) Applicant: DEERE & COMPANY, Moline, IL (US)

(72) Inventors: Pratul Vishwakarma, Koraon (IN); Piyush K. Choudhary, Pune (IN); Vilas Deshmukh, Malkapur (IN); Anjaliben Patel, Pune (IN)

(73) Assignee: Deere & Company, Moline, IL (US)

( * ) Notice: Subject to any disclaimer, the term of this patent is extended or adjusted under 35 U.S.C. 154(b) by 365 days.

(21) Appl. No.: 18/435,531

(22) Filed: Feb. 7, 2024

(65) Prior Publication Data

US 2025/0249832 A1 Aug. 7, 2025

(51) Int. Cl.
*B60R 3/02* (2006.01)

(52) U.S. Cl.
CPC .................................... *B60R 3/02* (2013.01)

(58) Field of Classification Search
CPC ........................................................ B60R 3/02
See application file for complete search history.

(56) References Cited

U.S. PATENT DOCUMENTS 3,869,022 A * 3/1975 Walk .................... E02F 9/0833 182/98
4,264,084 A * 4/1981 Telles ........................ B60R 3/02 182/115
7,240,947 B2 * 7/2007 Kuznarik ........... B62D 33/0273 296/62
8,186,763 B2 * 5/2012 Kramer ................. E01C 23/088 182/127
8,668,216 B2 * 3/2014 Ellement ................... E06C 5/28 182/127
9,447,638 B2 * 9/2016 Hedley ................... E06C 1/393
9,994,159 B2 * 6/2018 Giesmann ................. E06C 5/24
10,036,201 B1 * 7/2018 Haro .......................... E06C 7/02
2013/0048400 A1 * 2/2013 Holdener .................. E06C 5/20 182/115
2013/0092474 A1 * 4/2013 Magnussen ............... E06C 5/04 182/127
2016/0221510 A1 8/2016 Petersen
2021/0261060 A1 8/2021 Schwarz (Continued)

FOREIGN PATENT DOCUMENTS

EP 0065580 A1 12/1982

*Primary Examiner* — Jeffrey J Restifo
(74) *Attorney, Agent, or Firm* — Lucian Wayne Beavers; Summer Basham Todd; Patterson Intellectual Property Law, PC

(57) ABSTRACT

A step assembly for providing ingress to and egress from a utility vehicle. The step assembly includes a movable frame, a latch, and an actuation lever. The movable frame supports a plurality of steps and is configured to be movable relative to the utility vehicle between a stowed position and a deployed position. The latch is configured to selectively lock the movable frame in the stowed position and the deployed position. The actuation lever is operatively coupled to the latch and configured to unlock the movable frame from the stowed position to allow movement of the movable frame towards the deployed position. The actuation lever is also configured to unlock the movable frame from the deployed position to allow movement of the movable frame towards the stowed position.

20 Claims, 10 Drawing Sheets

(56) References Cited

U.S. PATENT DOCUMENTS

| | | | | |
|---|---|---|---|---|
| 2023/0158958 | A1 | 5/2023 | Ricketts | |
| 2025/0249832 | A1 * | 8/2025 | Vishwakarma | B60R 3/02 |
| 2025/0296506 | A1 * | 9/2025 | Sietsema | B60R 3/02 |
| 2025/0296507 | A1 * | 9/2025 | Sietsema | B60R 3/02 |

* cited by examiner

DEPLOYABLE STEP ASSEMBLY FOR AN AGRICULTURAL UTILITY VEHICLE

FIELD OF DISCLOSURE

The present disclosure relates to a step assembly for a utility vehicle.

BACKGROUND

The step assembly provides steps for a human operator to climb on and off the utility vehicle by foot, e.g., to/from the vehicle cabin. The utility vehicle may be agricultural.

SUMMARY

In one aspect, the disclosure provides a step assembly for providing ingress to and egress from a utility vehicle. The step assembly includes a movable frame, a latch, and an actuation lever. The movable frame supports a plurality of steps and is configured to be movable relative to the utility vehicle between a stowed position and a deployed position. The latch is configured to selectively lock the movable frame in the stowed position and the deployed position. The actuation lever is operatively coupled to the latch and configured to unlock the movable frame from the stowed position to allow movement of the movable frame towards the deployed position. The actuation lever is also configured to unlock the movable frame from the deployed position to allow movement of the movable frame towards the stowed position.

In another aspect, the disclosure provides a step assembly for providing ingress to and egress from a utility vehicle. The step assembly includes a movable frame, a first actuation lever, and a second actuation lever. The movable frame is configured to be movable relative to the utility vehicle between a stowed position and a deployed position, the movable frame supporting a plurality of steps. The first actuation lever is configured to be accessible by the operator from the ground. The first actuation lever is further configured to unlock the frame to allow movement between the stowed and deployed positions. The second actuation lever is configured to be accessible by the operator from the utility vehicle. The second actuation lever is also further configured to unlock the frame to allow the movement between the stowed and deployed positions.

In another aspect, the disclosure provides a utility vehicle having a step assembly for providing ingress to and egress from the utility vehicle. The utility vehicle includes a chassis, a movable frame, a latch, and an actuation lever. The movable frame supports a plurality of steps and is configured to be movable relative to the utility vehicle between a stowed position and a deployed position. The latch is configured to selectively lock the movable frame in the stowed position and the deployed position. The actuation lever is operatively coupled to the latch and configured to unlock the movable frame from the stowed position to allow movement of the movable frame towards the deployed position. The actuation lever is also configured to unlock the movable frame from the deployed position to allow movement of the movable frame towards the stowed position.

In yet another aspect, the disclosure provides a utility vehicle having a step assembly for providing ingress to and egress from the utility vehicle. The utility vehicle includes a chassis, a movable frame, a first actuation lever, and a second actuation lever. The movable frame is configured to be movable relative to the utility vehicle between a stowed position and a deployed position, the movable frame supporting a plurality of steps. The first actuation lever is configured to be accessible by the operator from the ground. The first actuation lever is further configured to unlock the frame to allow movement between the stowed and deployed positions. The second actuation lever is configured to be accessible by the operator from the utility vehicle. The second actuation lever is also further configured to unlock the frame to allow the movement between the stowed and deployed positions.

Other aspects of the disclosure will become apparent by consideration of the detailed description and accompanying drawings.

DETAILED DESCRIPTION

Figure 1:
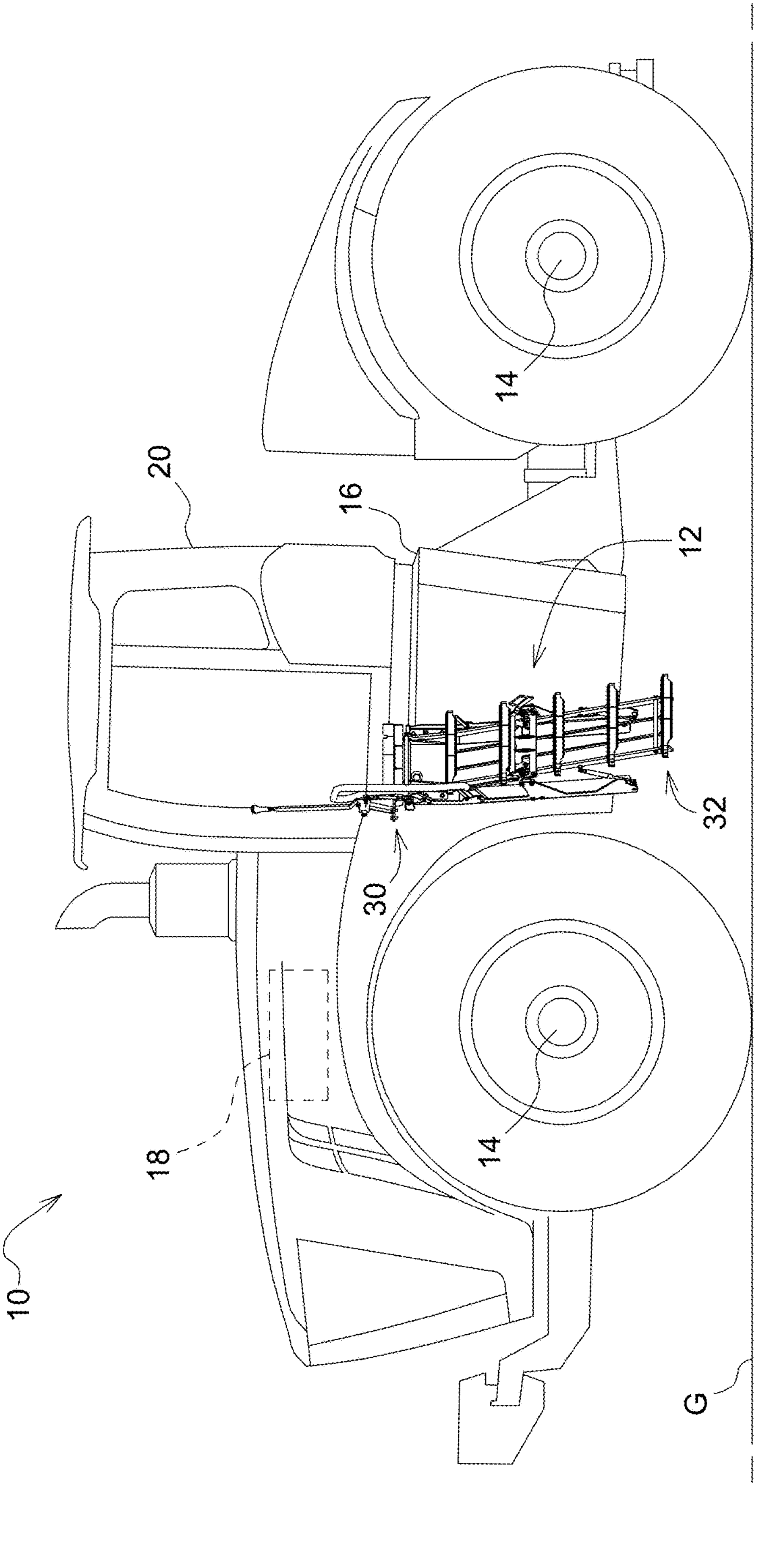
FIG. 1 is an elevation view of a utility vehicle having a step assembly in accordance with an implementation of the present disclosure.

Before any constructions of the disclosure are explained in detail, it is to be understood that the disclosure is not limited in its application to the details of construction and the arrangement of components set forth in the following description or illustrated in the accompanying drawings. The disclosure is capable of supporting other constructions and of being practiced or of being carried out in various ways.

In general, utility vehicles, such as agricultural vehicles, construction vehicles, forestry vehicles, mining vehicles, etc. are significantly elevated above the ground. Such elevation makes it difficult for an operator to access the vehicle. A step assembly is provided on the utility vehicle to provide ingress to and egress from the utility vehicle.

The disclosure provides an improved step assembly. To improve accessibility during ingress and egress, the step assembly includes a movable frame deployable away from the vehicle to a deployed position that lowers the gradient angle of the step assembly. The lower gradient angle of the movable frame in the deployed position makes it easier for operators of different physical abilities to access the vehicle comfortably.

The movable frame is movable to a stowed position closer to the vehicle, which may be useful during transport or operation of the utility vehicle. The step assembly is more compact in the stowed position.

The step assembly may also improve accessibility/serviceability for nearby components such as the vehicle battery.

The step assembly may be installed across different series of a certain type of utility vehicle, different sizes of utility vehicles, or across different types of utility vehicles, including utility vehicle implements. This reduces the number of differing parts to be used in different applications.

The step assembly may include a releasable latch mechanism for locking and unlocking the movable frame. Advantageously, the latch mechanism may be coupled to a two-way actuation lever that is operable to unlock the latch mechanism in both the deployed position and the stowed position. The two-way actuation lever is actuatable in a pulling direction and a pushing direction, which are different directions. The pulling direction and pushing direction may be opposite directions, such as towards and away from the operator, or clockwise and counterclockwise, etc. The two-way actuation lever may function to unlock the latch mechanism when actuated in the pulling direction and may also function to unlock the latch mechanism when actuated in the pushing direction. Also advantageously, a pull force applied by the operator in the pulling direction to unlock the latch mechanism in the stowed position may include a component of force required to then pull the movable frame from the stowed position to the deployed position. Similarly, a pushing force applied by the operator in the pushing direction to unlock the latch mechanism in the deployed position may include a component of force required to then push the movable frame from the deployed position to the stowed position. Thus, the two-way actuation lever provides an intuitive solution for deploying and stowing the movable frame by being actuatable for unlocking using generally the same motion required for deploying or stowing. In some implementations, a gas spring(s), hydraulic actuator(s), pneumatic actuator(s), motorized actuator(s), and/or any other suitable type of actuator(s), damper(s), shock(s), etc. may be employed to provide some or all of the force required for pushing and/or pulling the movable frame between the deployed and stowed positions. Thus, the force for moving the movable frame may be provided by the operator, by a mechanism, or a combination of both.

The latch mechanism locks the movable frame in both the stowed and deployed positions, thereby inhibiting movement of the movable frame out of said positions in the locked condition. As one example, a pushing or pulling force applied to the movable frame itself (e.g., to one of the steps) would not act to move the movable frame in the locked condition due to blocking provided by the latch mechanism in the locked condition. Similarly, the movable frame is inhibited from bouncing out of the stowed position, e.g., during movement of the vehicle across rough terrain. The latch mechanism may be biased to automatically lock when the stowed position or deployed position is reached. More than one deployed position, providing different gradient angles, may be provided.

In some implementations, two two-way actuation levers may be provided for unlocking the latch mechanism, e.g., a first two-way actuation lever disposed closer to a lower distal end of the movable frame and accessible by the operator when disembarked (e.g., standing on the ground) and a second two-way actuation lever disposed closer to an upper distal end of the movable frame and accessible by the operator when embarked on the utility vehicle. Both two-way actuation levers may be operable to unlock the latch mechanism. Thus, the operator is able to deploy and stow the movable frame whether they are embarked or disembarked from the utility vehicle.

FIG. 1 illustrates a utility vehicle 10 having a step assembly 12. The utility vehicle 10 may be embodied as an agricultural utility vehicle, a construction vehicle, a forestry vehicle, a mining vehicle, or any other utility vehicle. The utility vehicle 10 may also be embodied as an implement (e.g., a trailer, container, etc.) on which the step assembly 12 for ingress and egress is useful. The step assembly 12 may also be implemented in non-vehicle applications.

In the illustrated example of FIG. 1, the utility vehicle 10 may be a tractor. The utility vehicle 10 may include a plurality of wheels 14, such as wheels with tires or tracks for engaging the ground G, and a chassis 16 supported by the wheels 14. In some implementations, the utility vehicle may include a prime mover 18 for powering tractive effort. In the illustrated example, the utility vehicle 10 may also include a cabin 20 supported by the chassis 16.

Figure 2:
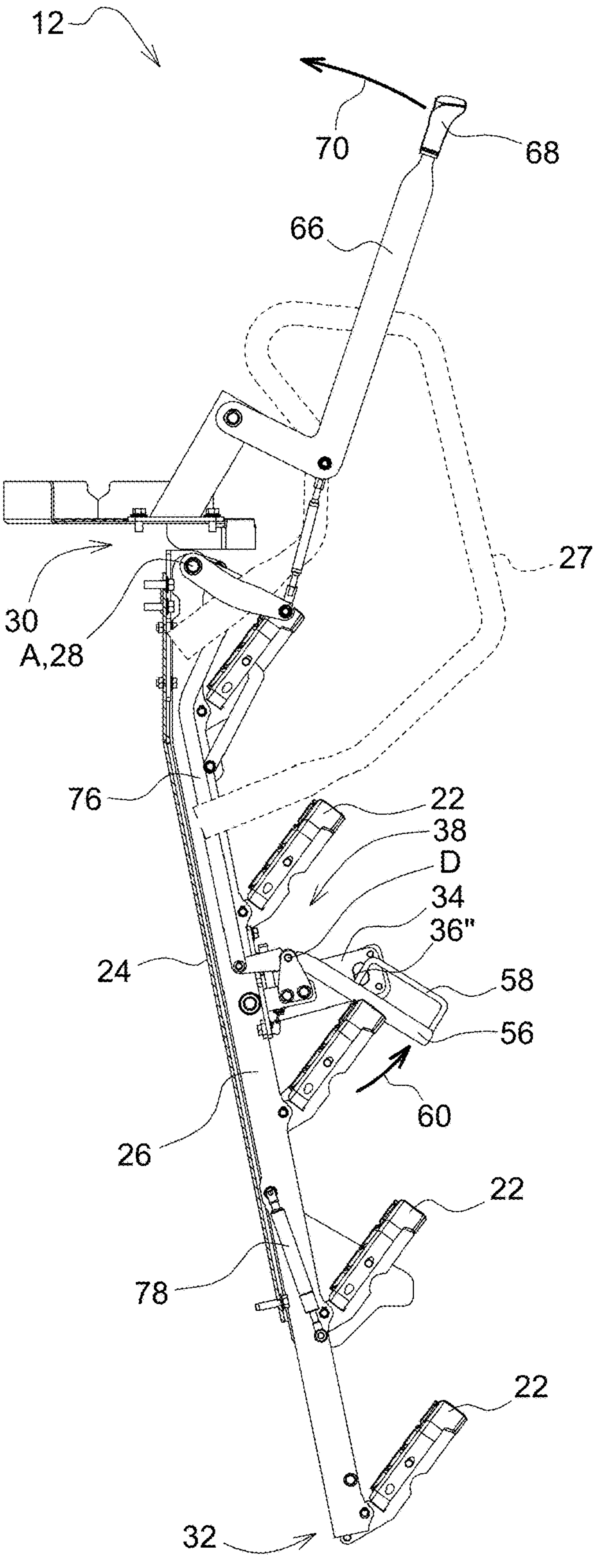
FIG. 2 is a side view of the step assembly of FIG. 1 in a stowed position.
Figure 3:
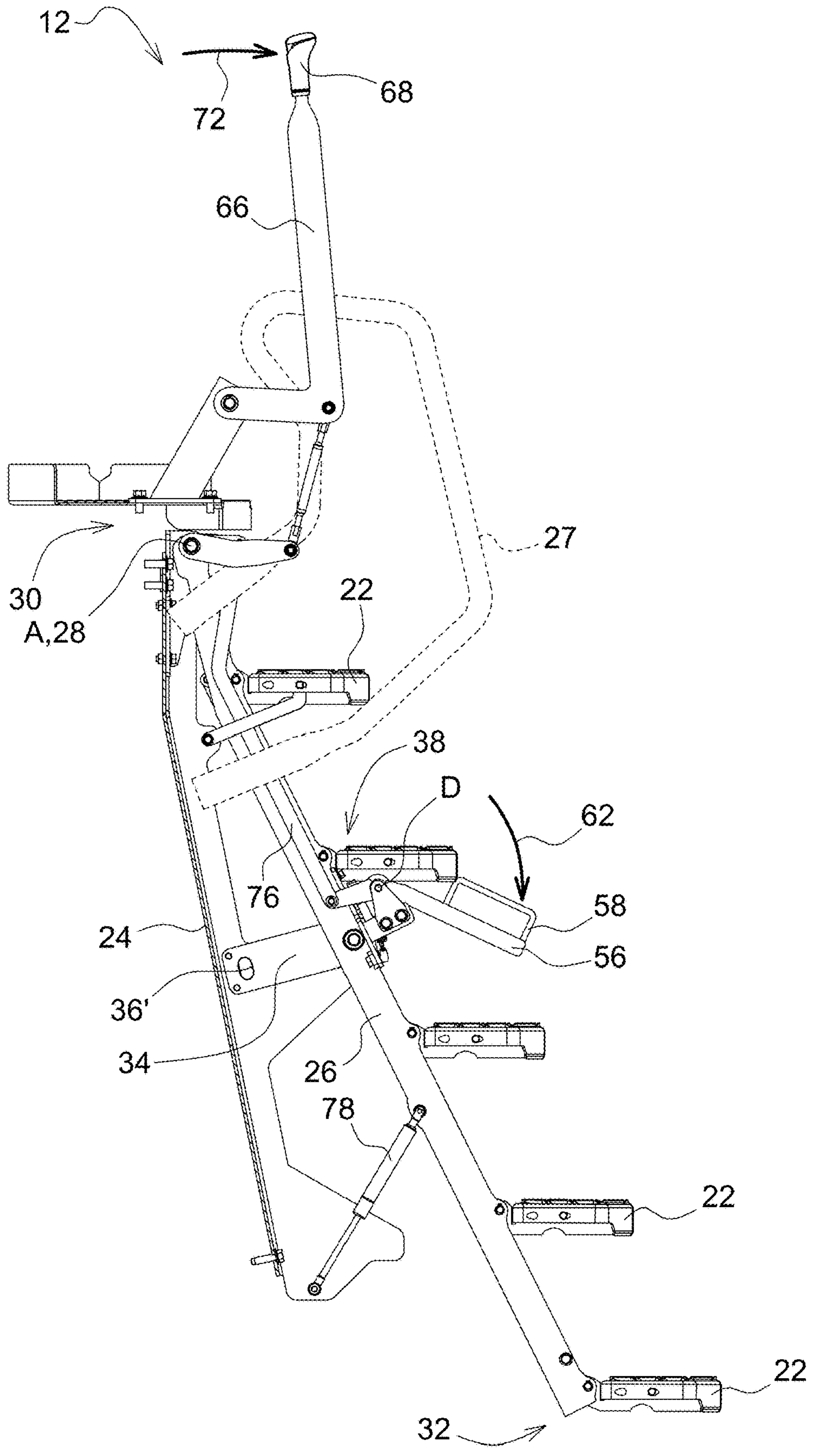
FIG. 3 is a side view of the step assembly of FIG. 1 in a deployed position.

FIG. 2 illustrates the step assembly 12 in a stowed position. FIG. 3 illustrates the step assembly 12 in a deployed position. The step assembly 12 is movable between the stowed position and the deployed position. The step assembly 12 includes a fixed frame 24 and a movable frame 26 that is movable with respect to the fixed frame 24. The fixed frame 24 is configured to be fixedly mounted to the utility vehicle 10 (or other applicable device) in any suitable fashion. The fixed frame 24 does not move relative to the utility vehicle 10. For example, the fixed frame 24 may be mounted to the chassis 16 or any other suitable location. In some implementations, the fixed frame 24 may be integrated as part of the utility vehicle 10 (or other applicable device) such that the movable frame 26 is movably mounted to the utility vehicle 10 (or other applicable device) more directly. The movable frame 26 supports a plurality of steps 22 configured for the operator to climb onto and off of the utility vehicle 10 by foot. Thus, the movable frame 26 may interchangeably be referred to as a movable step frame 26. The plurality of steps 22 are disposed in series between a lower distal end 32 and an upper distal end 30 of the movable frame 26. The step assembly 12 may include a grab rail 27 configured for the operator to grip by hand while climbing the steps 22 by foot.

In the illustrated implementation, the movable frame 26 is movably mounted to the fixed frame 24 by a hinge 28 (FIGS. 2-3). The hinge 28 may be disposed in any suitable location on the movable frame 26. In the illustrated example, the hinge 28 may be disposed proximate the upper distal end 30 of the movable frame 26. The upper distal end 30 may be understood to be farther from the ground G than the lower distal end 32 or closer to the cabin 20 than the lower distal end 32. “Upper” and “lower” and like terms used herein may also be understood relative to gravity during normal orientations of use (e.g., with the wheels 14 on the ground G). The hinge 28 may have any suitable structure for allowing movement of the movable frame 26 relative to the fixed frame 24 while being coupled thereto. In the illustrated example, the hinge 28 may include a pin or shaft defining a frame pivot axis A. The frame pivot axis A may be substantially parallel with the ground G. In other examples, the hinge 28 may include a linkage. The movable frame 26 may be movable about a pivot axis that is fixed relative to the fixed frame 24 (such as the illustrated frame pivot axis A) or a pivot axis that is movable relative to the fixed frame 24 (e.g., by way of a more complex linkage), or in any other suitable manner.

Figure 5:
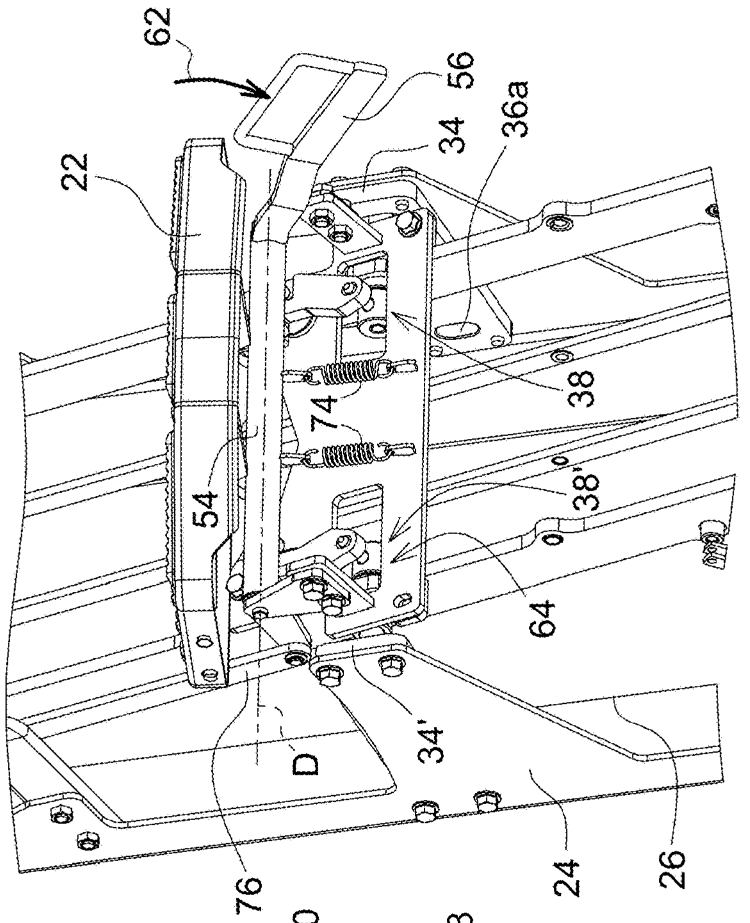
FIG. 5 is an enlarged perspective view of a portion of the step assembly of FIG. 3 in the deployed position.
Figure 4:
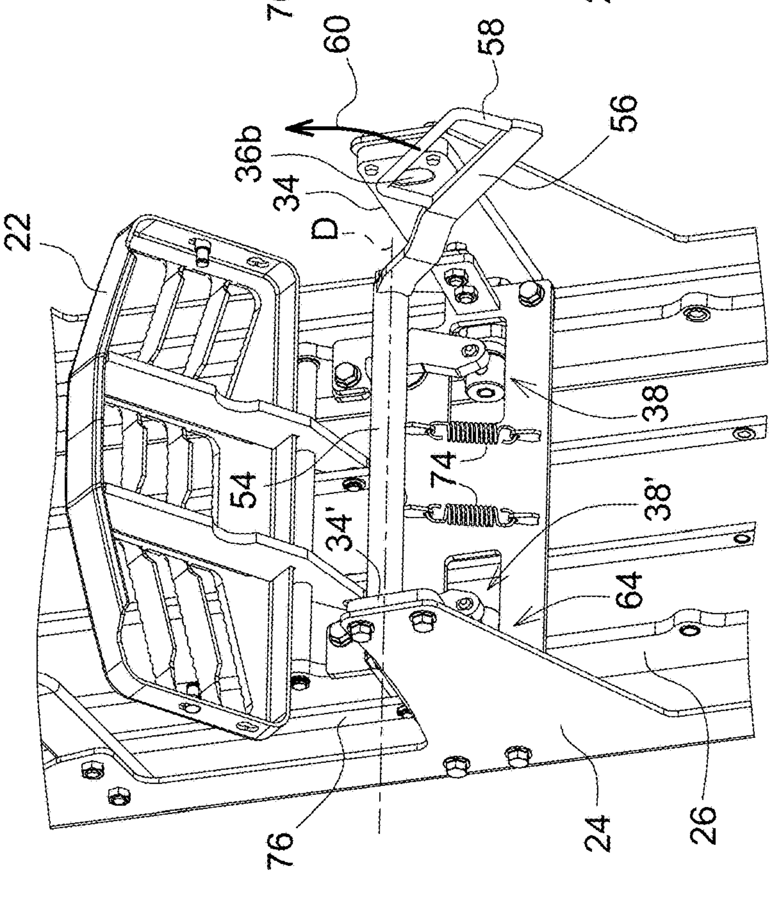
FIG. 4 is an enlarged perspective view of a portion of the step assembly of FIG. 2 in the stowed position.

With reference to FIGS. 4-5, a bracket 34 defining apertures 36*a*, 36*b* protrudes from the utility vehicle 10. The bracket 34 may be a first bracket, and the illustrated example may include a second bracket 34' that is a mirror image of the first bracket 34. Reference is made herein to the description of the bracket 34 such that the second bracket 34' need not be described separately. The apertures of the second bracket 34' are labeled in the drawings as the first aperture 36*a'* and the second aperture 36*b'*. In the illustrated example, the movable frame 26 is disposed between the first and second brackets 34, 34'.

The bracket 34 may be coupled to the fixed frame 24 (as illustrated), may be formed monolithically with the fixed frame 24, or may be coupled directly to the utility vehicle 10, etc. The apertures 36*a*, 36*b* may be embodied as recesses (as illustrated), holes, slots, notches, etc., or any suitable structure providing a space-to-be-selectively-occupied by a lock member and a stop surface for inhibiting movement of the lock member. Any number of apertures may be employed. In the illustrated example, there are two apertures 36*a*, 36*b*, which may be referred to as a first aperture 36*a* and a second aperture 36*b*. The first aperture 36*a* corresponds with the stowed position of the movable frame 26 (FIG. 4) and the second aperture 36*b* corresponds with the deployed position of the movable frame 26 (FIG. 5). Multiple deployed positions are also possible. In other implementations, the movable frame 26 may be infinitely adjustable between extremes.

Figure 6:
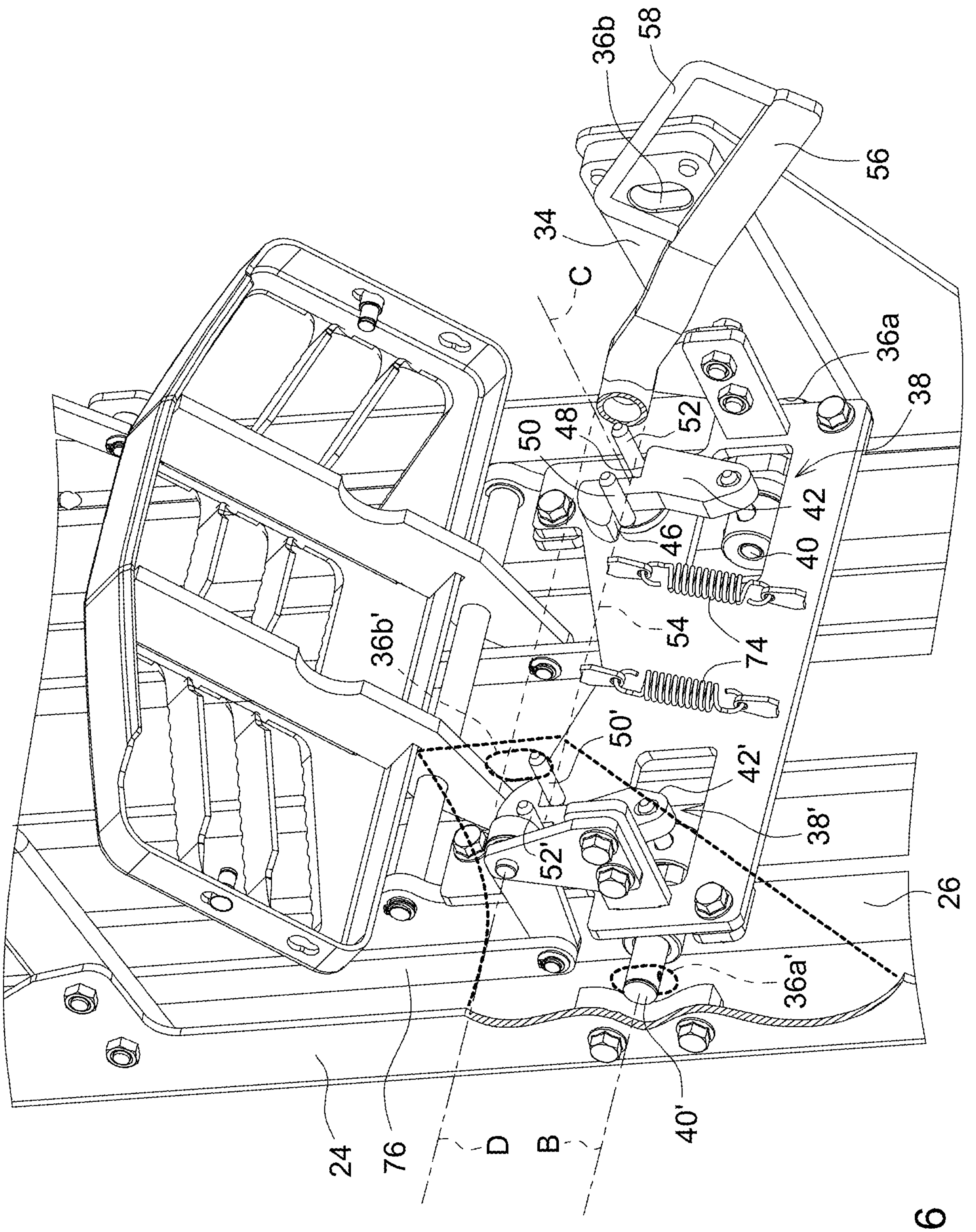
FIG. 6 is a further enlarged view of the step assembly of FIG. 4 locked in the stowed position and having some components shown in phantom.
Figure 7:
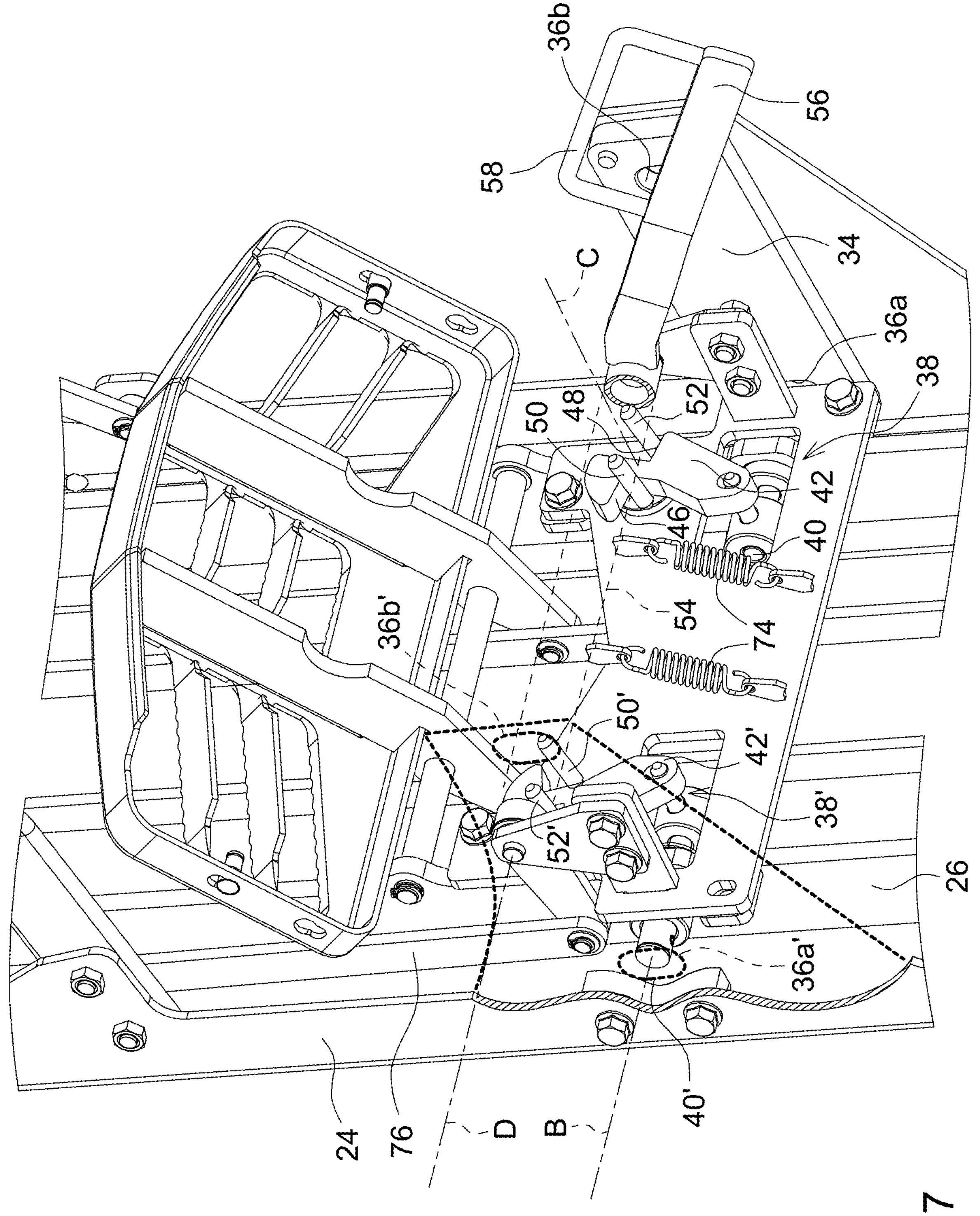
FIG. 7 is a further enlarged view of the step assembly of FIG. 4 unlocked in the stowed position and having some components shown in phantom.
Figure 8:
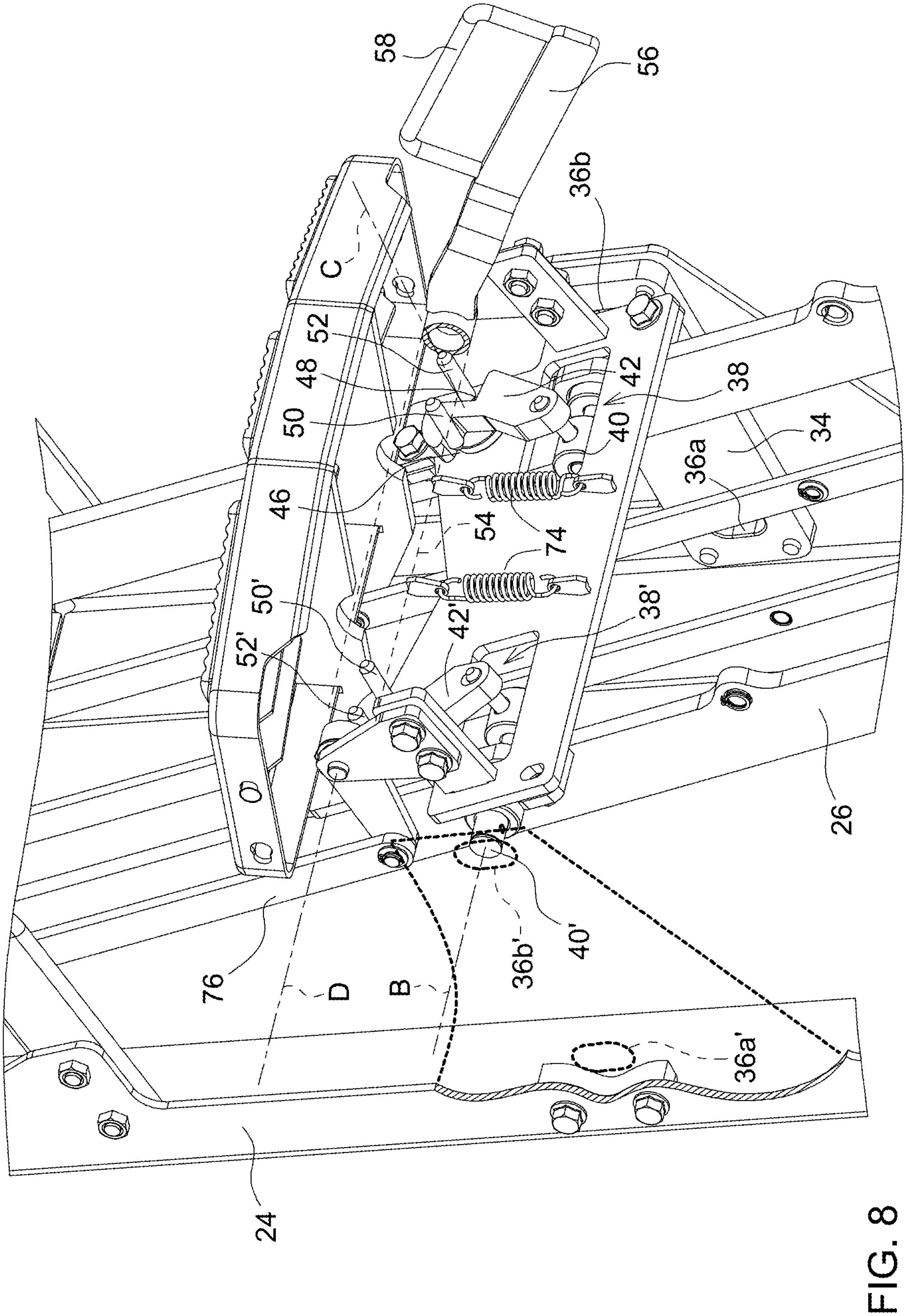
FIG. 8 is a further enlarged view of the step assembly of FIG. 5 unlocked in the deployed position and having some components shown in phantom.
Figure 9:
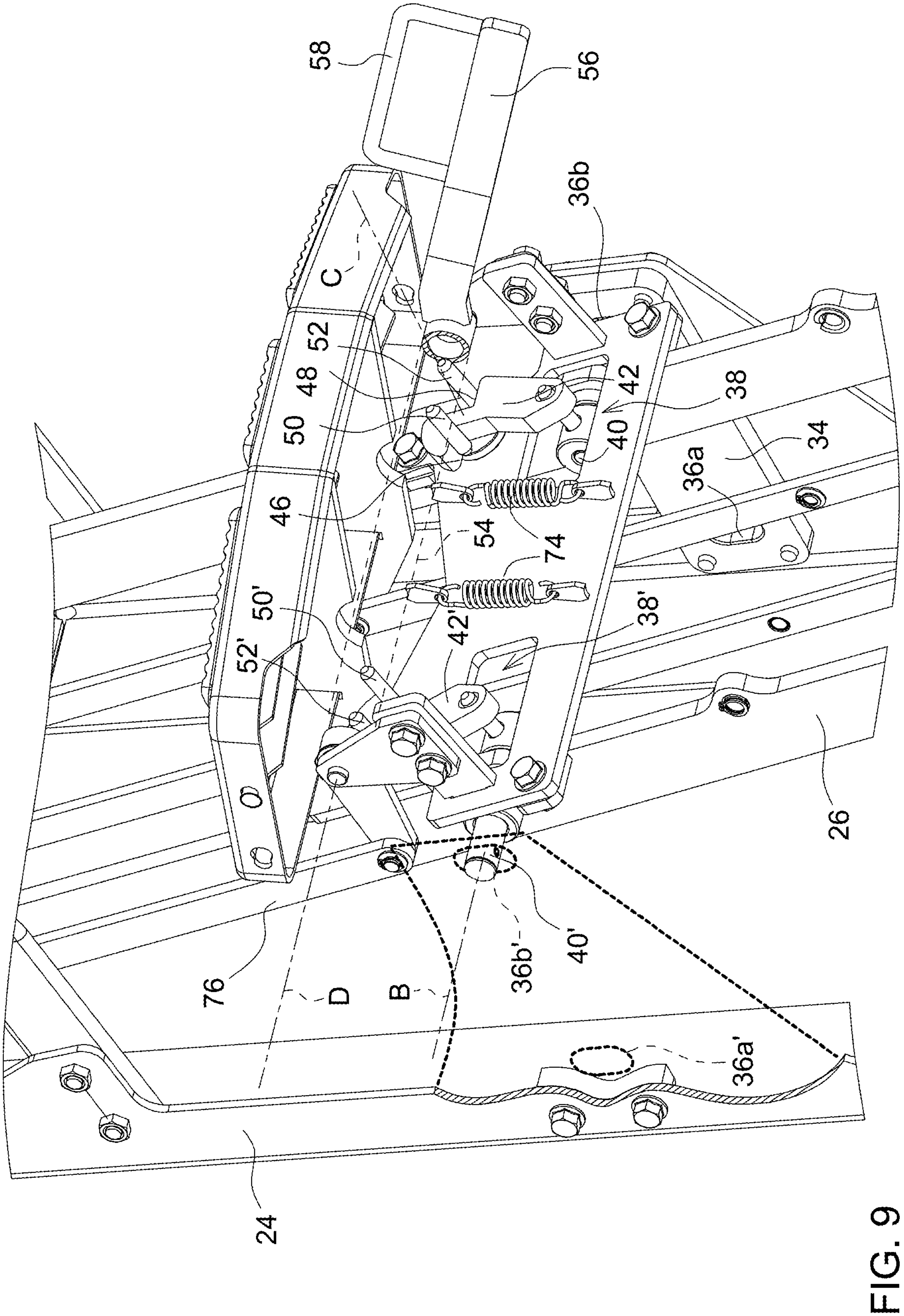
FIG. 9 is a further enlarged view of the step assembly of FIG. 5 locked in the deployed position and having some components shown in phantom.

As best illustrated in FIGS. 6-9, a latch mechanism 38 is configured to lock the movable frame 26 in the stowed position (FIG. 6) and the deployed position (FIG. 9). The latch mechanism 38, which may also be referred to interchangeably as a latch 38, may have any suitable structure. For example, the latch mechanism 38 may include a lock pin 40 embodied as any suitable projection configured to register with one of the apertures 36*a*, 36*b* in a locked condition, such as a pin, a pawl, a hook, a rocker, a pivot, a bar, a flange, or any other locking protrusion, etc. In the illustrated example, the latch mechanism 38 includes the lock pin 40 configured to register with one of the apertures 36*a*, 36*b* in the locked condition. When registered with the first aperture 36*a*, the latch mechanism 38 locks the movable frame 26 in the stowed position (FIG. 6). When registered with the second aperture 36*b*, the latch mechanism 38 locks the movable frame 26 in the deployed position (FIG. 9).

The latch mechanism 38 may include any suitable structure for moving the lock pin 40 between the locked condition (FIGS. 6 and 9) and an unlocked condition (FIGS. 7 and 8). In the unlocked condition, the lock pin 40 is removed from the aperture 36*a*, 36*b* such that the lock pin 40 does not block movement of the movable frame 26. Thus, in the unlocked condition, the movable frame 26 is movable between the stowed and deployed positions by application of an external force.

Figure 10:
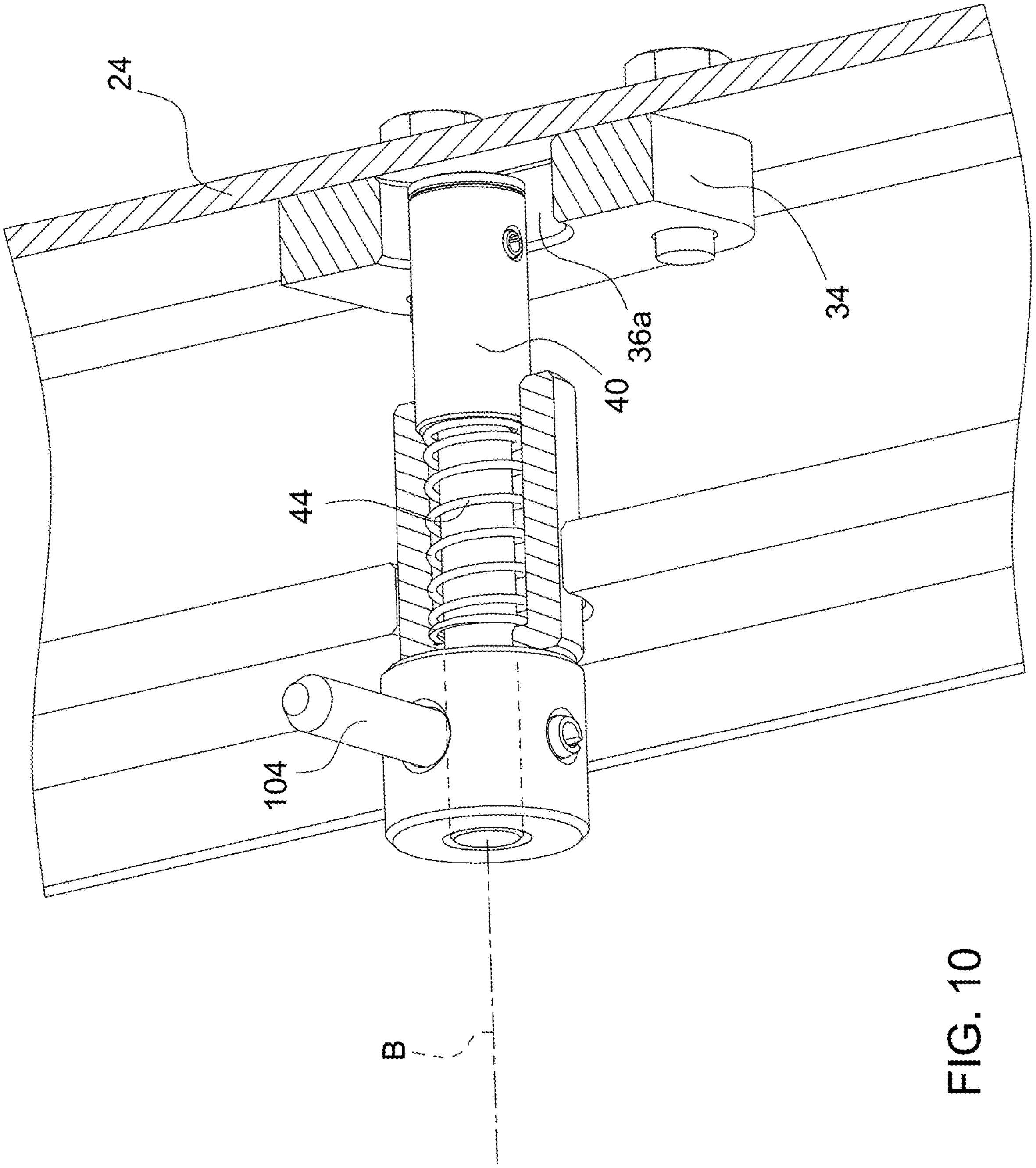
FIG. 10 is a further enlarged view of a portion of the step assembly of FIG. 6 locked in the stowed position sectioned to illustrate a biased lock pin.

As one example, the latch mechanism 38 may include a crank 42 for moving the lock pin 40 between the locked condition (FIGS. 6 and 9) and the unlocked condition (FIGS. 7 and 8). The crank 42 may be coupled to the lock pin 40 in any suitable manner. As one example, a coupling pin 104 (FIG. 10) may couple the lock pin 40 to the crank 42. More specifically, the crank 42 may be configured to pull the lock pin 40, e.g., in a movement direction B of the lock pin 40. The latch mechanism 38 may include a biasing member 44 (such as a spring, an elastomeric material, etc.), illustrated in FIG. 10, configured to bias the lock pin 40 towards the locked condition. Thus, the crank 42 may pull the lock pin 40 against the bias of the biasing member 44. The crank 42 may be embodied as a rigid body. The crank 42 may also be movable between first and second positions relative to the movable frame 26. The crank 42 may be movably mounted to the movable frame 26. The crank 42 may also include a first guided surface 46 and a second guided surface 48. The first position of the crank 42 may correspond with the locked condition of the lock pin 40 (FIGS. 6 and 9) and the second position of the crank 42 may correspond with the unlocked condition of the lock pin 40 (FIGS. 7 and 8). Any suitable type of movement may be employed, but in the illustrated example the crank 42 may be rotatable about a rotation axis C. In the illustrated example, the first actuation surface 46 is configured, when pushed, to move the crank 42 about the rotation axis C from the first position to the second position to unlock the lock pin 40. The second actuation surface 48, when pushed, is also configured to move the crank 42 in the same direction about the rotation axis C, i.e., to unlock the pin 40.

To move the crank 42, a first guide protrusion 50 is configured to engage and push the first guided surface 46 and a second guide protrusion 52 is configured to engage and push the second guided surface 48. The first and second guide protrusions 50, 52 may each extend independently from a lever link 54. The lever link 54 may have any suitable configuration for moving the first and second guide protrusions 50, 52 into and out of engagement with the crank 42. In the illustrated example, the lever link 54 may be configured as a shaft rotatable about a link axis D. The lever link 54 is movable by an actuation lever 56. As one example, the actuation lever 56 has a cantilevered arm configuration with a grip portion 58 (FIGS. 4-5) configured for the operator's hand to grip and apply a force for unlocking the latch mechanism 38 and, in some implementations, also for pulling and pushing the movable frame 26 between the stowed and deployed positions. The actuation lever 56 and the lever link 54 are movably mounted with respect to the movable frame 26. In the illustrated example, the actuation lever 56 and the lever link 54 are pivotably mounted to the movable frame 26 about the link axis D. The actuation lever 56 is fixed with respect to the lever link 54 such that movement of the actuation lever 56 about the link axis D causes the lever link 54 to rotate about the link axis D.

One or more balancing springs 74 may be provided to balance the lever link 54. The balancing springs 74 may be operatively coupled between the lever link 54 and a portion of the movable frame 26.

FIG. 2 illustrates a pulling direction 60. In operation, when an external force (e.g., from the operator) is applied to the actuation lever 56 in the pulling direction 60 when the movable frame 26 is locked in the stowed position as illustrated in FIGS. 2 and 4, the lever link 54 rotates about the link axis D in a first direction. Movement of the lever link 54 in the first direction while the movable frame 26 is locked in the stowed position is shown from FIG. 6 (locked) to FIG. 7 (unlocked). In these conditions, the first guide protrusion 50 engages the first guided surface 46 to rotate the crank 42 to pull the lock pin 40 to the unlocked condition (FIG. 7). Once the lock pin 40 is in the unlocked condition, further force applied in the pulling direction 60 acts to move the movable frame 26 towards the deployed position (FIGS. 3 and 5). By the force of the biasing member 44, the lock pin 40 may automatically lock when the second aperture 36*b* registering the deployed position is reached. Movement of the lock pin 40 to the locked condition may cause some movement of the lever link 54 and the actuation lever 56 (e.g., back to the locking position of the actuation lever 56). In some implementations, the operator may move the actuation lever 56 to move the lock pin 40 to the locked condition.

FIG. 3 illustrates a pushing direction 62. In operation, when an external force (e.g., from the operator) is applied to the actuation lever 56 in the pushing direction 62 when the movable frame 26 is locked in the deployed position as illustrated in FIG. 5, the lever link 54 rotates about the link axis D in a second direction opposite the first direction. Movement of the lever link 54 in the second direction while the movable frame 26 is locked in the deployed position is shown from FIG. 9 (locked) to FIG. 8 (unlocked). In these conditions, the second guide protrusion 52 engages the second guided surface 48 to rotate the crank 42 to pull the lock pin 40 to the unlocked condition (FIG. 8). Once the lock pin 40 is in the unlocked condition, further force applied in the pushing direction 62 acts to move the movable frame 26 towards the stowed position (FIGS. 2 and 4). By the force of the biasing member 44, the lock pin 40 may automatically lock when the first aperture 36*a* registering the stowed position is reached. Movement of the lock pin 40 to the locked condition may cause some movement of the lever link 54 and the actuation lever 56. In some implementations, the operator may move the actuation lever 56 to move the lock pin 40 to the locked condition.

Thus, the latch mechanism 38 is configured to unlock when the actuation lever 56 is actuated in the pulling direction 60 and the pushing direction 62. In other words, the actuation lever 56 may be referred to as a two-way actuation lever 56 because the actuation lever 56 can be pulled or pushed from a central locking position to one of two unlocking positions on either side of the central locking position.

An optional second latch mechanism 38' may be provided. The second latch mechanism 38' may be a mirror image of the latch mechanism 38. The second latch mechanism 38' may be disposed proximate an opposite end 64 (FIG. 4) of the lever link 54 relative to the latch mechanism 38 to balance the lateral sides of the movable frame 26. Reference is made to the description of the latch mechanism 38 such that the second latch mechanism 38' need not be described again. Corresponding components of the second latch mechanism 38' may be labeled in the drawings using the same reference characters associated with the latch mechanism 38 plus "'" thereafter. Each of the latch mechanisms 38, 38' may be simultaneously unlocked by actuation of the actuation lever 56. The lever link 54 may be provided, at the opposite end 64, with a mirrored first and second guide protrusion 50', 52' to accomplish the simultaneous unlocking.

Returning to FIGS. 2 and 3, an egress lever 66 may be operably coupled to the latch mechanism(s) 38, 38'. The egress lever 66 may unlock the latch mechanism(s) 38, 38' independently from the actuation lever 56 in any suitable manner. As one example, the egress lever 66 may be coupled to the lever link 54 by a linkage 76 configured to cause rotation of the lever link 54 about the link axis D, thereby unlocking the latch mechanism(s) 38, 38' in the same manner as discussed above with respect to the actuation lever 56. In other implementations, only one of the levers need be employed to unlock the latch mechanism(s) 38, 38'.

The egress lever 66 may be disposed proximate the upper distal end 30. The higher location of the egress lever 66 relative to the actuation lever 56, and its proximity to the cabin 20, makes the egress lever 66 more accessible to the operator when the operator is on the vehicle 10. In contrast, the location of the actuation lever 56, closer to the ground G, makes the actuation lever 56 more accessible to the operator when the operator is on the ground G. The actuation lever 56 may be referred to as an ingress lever 56 interchangeably.

The egress lever 66 may include an egress grip portion 68 defining an egress lever pulling direction 70 (FIG. 2). The egress lever pulling direction 70 is, in rotation about the link axis D, generally the same rotational direction as the pulling direction 60 of the actuation lever 56 about the link axis D (e.g., counterclockwise in the view of FIG. 2). The egress lever 66 also defines an egress lever pushing direction 72 (FIG. 3). The egress lever pushing direction 72 is, in rotation about the link axis D, generally the same rotational direction as the pushing direction 62 (e.g., clockwise in the view of FIG. 3). As such, actuation of the egress lever 66 in the pulling direction 70 while the movable frame 26 is stowed causes the latch mechanism(s) 38, 38' to unlock. Actuation of the egress lever 66 in the pushing direction 72 while the movable frame 26 is in the deployed position causes the latch mechanism(s) 38, 38' to unlock.

As illustrated in FIGS. 2-3, a gas spring(s) 78 may be operatively coupled between the fixed frame 24 and the movable frame 26. Two gas springs 78 are employed in the illustrated implementation, though one, three, four, or any number may be employed in other implementations. The gas springs 78 provide at least some of the external force for deploying and/or stowing the movable frame 26. The gas springs 78 may be biased to extend to provide at least some of the external force for moving the movable frame 26 from the stowed to the deployed position when unlocked from the stowed position, while also configured to dampen the force of the movable frame 26 collapsing back into the stowed position under the force of gravity when unlocked from the deployed position. The gas springs 78 may be toggling gas springs to provide force in both directions. Other types of force mechanisms, dampers, shocks, etc. may be employed additionally or alternatively to achieve the desired force effect.

Figure 11:
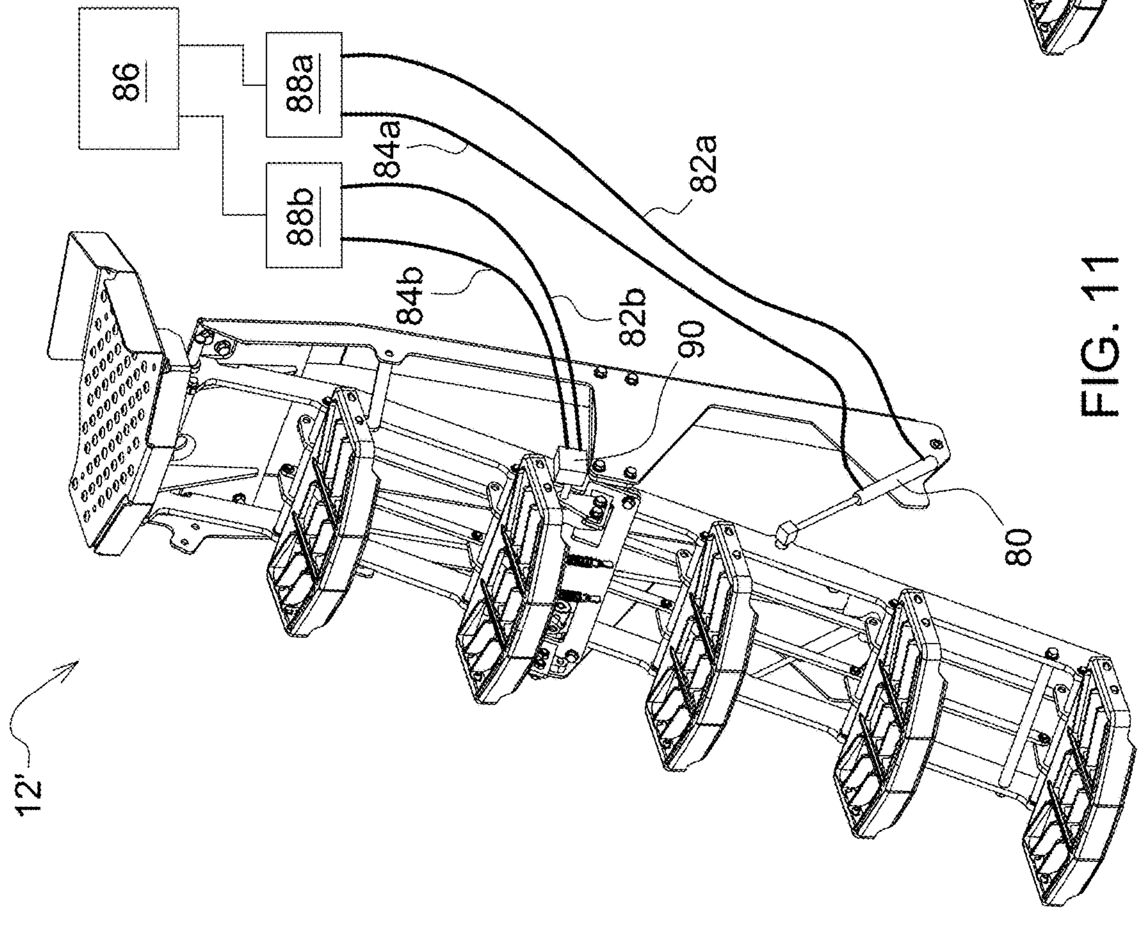
FIG. 11 is a perspective view of an alternative implementation of the step assembly.

FIG. 11 illustrates an alternative implementation of a step assembly 12', which may be substantially the same as the step assembly 12 described above except where differences are described below. Reference is made to the entire description of the step assembly 12 herein such that the step assembly 12' need only be described with respect to differences. As one example, the step assembly 12' includes at least one pressure cylinder(s) 80 provided in place of the gas spring(s) 78. The pressure cylinder(s) 80 are operable to control movement of the movable frame 26 between the stowed and deployed positions. The pressure cylinder(s) 80 may be embodied as a hydraulic cylinder(s), a pneumatic cylinder(s), etc. In the illustrated implementation, two pressure cylinder(s) 80 are employed; however, one, three, four, or more pressure cylinders may be employed in other examples. Pressure lines 82*a*, 84*a* are ported to opposite ends of the pressure cylinder(s) 80. A pressure source 86 (e.g., a hydraulic or pneumatic power source) is fluidly coupled to the pressure cylinder(s) 80 by way of a control valve 88*a* and the pressure lines 82*a*, 84*a*. The step assembly 12' need not include the actuation lever 56 and the egress lever 66. Instead, locking and unlocking of the movable frame 26 may by achieved with pneumatic and/or hydraulic controls. For example, a pressurized fluid motor 90 may be employed to lock and unlock the latch mechanism(s) 38, 38'. The pressurized fluid motor 90 may be fluidly connected to the pressure source 86 in any suitable manner, e.g., by pressure lines 82*b*, 84*b* and a control valve 88*b*. Other types of motors or actuators may also be employed.

Figure 12:
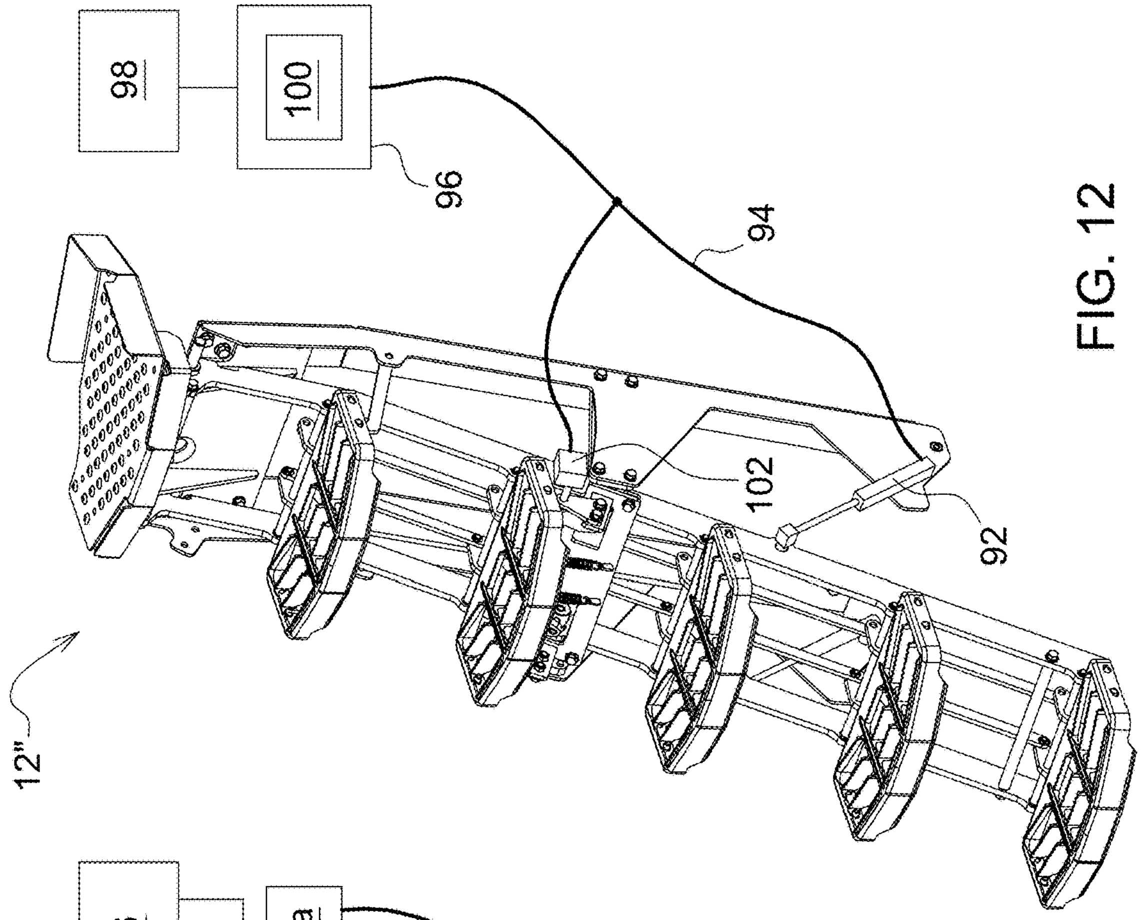
FIG. 12 is a perspective view of another alternative implementation of the step assembly.

FIG. 12 illustrates an alternative implementation of a step assembly 12", which may be substantially the same as the step assembly 12 described above except where differences are described below. Reference is made to the entire description of the step assembly 12 herein such that the step assembly 12" need only be described with respect to differences. As one example, the step assembly 12" includes at least one electric actuator(s) 92 provided in place of the gas spring(s) 78. The electric actuator(s) 92 are operable to control movement of the movable frame 26 between the stowed and deployed positions. In the illustrated implementation, two electric actuator(s) 92 are employed; however, one, three, four, or more may be employed in other implementations. The electric actuator(s) 92 may be embodied as, for example, a linear actuator(s). A wire harness 94 is electrically coupled to the electric actuator(s) 92 and to a control panel 96. An electrical power source 98 is electrically coupled to the electric actuator(s) 92 by way of the control panel 96 and the wire harness 94. The control panel 96 may include one or more actuators 100 (such as a button, switch, lever, touch screen, etc.) for controlling operation of the electric actuator(s) 92. The step assembly 12" need not include the actuation lever 56 and the egress lever 66. Instead, locking and unlocking of the movable frame 26 may by achieved with electrical controls. For example, an electric motor 102 may be employed to lock and unlock the latch mechanism(s) 38, 38'. Other types of motors or actuators may also be employed.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Thus, the disclosure provides, among other things, a lockable step assembly that is movable between stowed and deployed positions when unlocked. The disclosure also provides a latching mechanism for locking the step assembly and a two-way actuation lever for unlocking the latching mechanism. The disclosure also provides an ingress lever to unlock the latch mechanism from the bottom of the step assembly and an egress lever to unlock the latch mechanism from the top of the step assembly. Various features and advantages of the disclosure are set forth in the following claims.

What is claimed is:

1. A step assembly for providing ingress to and egress from a utility vehicle, the step assembly comprising:

a movable frame supporting a plurality of steps, the movable frame configured to be movable relative to the utility vehicle between a stowed position and a deployed position;

a latch configured to selectively lock the movable frame in the stowed position and the deployed position; and an actuation lever operatively coupled to the latch and configured to unlock the movable frame from the stowed position to allow movement of the movable frame towards the deployed position, and configured to unlock the movable frame from the deployed position to allow movement of the movable frame towards the stowed position.

2. The step assembly of claim 1, wherein the actuation lever is movable in a first direction and a second direction different from the first direction, wherein movement of the actuation lever in both the first and second directions is operable to unlock the movable frame.

3. The step assembly of claim 2, wherein movement of the actuation lever in the first direction is operable to unlock the movable frame from the stowed position, and wherein movement of the actuation lever in the second direction is operable to unlock the movable frame from the deployed position.

4. The step assembly of claim 2, wherein the first direction is opposite the second direction.

5. The step assembly of claim 1, wherein the latch further comprises:

a lock pin configured to selectively lock the movable frame in the stowed position and the deployed position; and a rotatable crank operatively coupled between the lock pin and the actuation lever to move the lock pin in response to movement of the actuation lever.

6. The step assembly of claim 5, further comprising:

a first guide protrusion and a second guide protrusion each configured to move by actuation of the actuation lever, wherein the actuation lever is movable in a first direction and a second direction opposite the first direction, wherein the first guide protrusion is configured to engage the rotatable crank when the actuation lever is moved in the first direction and the second guide protrusion is configured to engage the rotatable crank when the actuation lever is moved in the second direction, wherein the first and second guide protrusions both are configured to rotate the rotatable crank in the same rotational direction for unlocking the lock pin.

7. The step assembly of claim 1, further comprising a hinge coupled to the movable frame for allowing movement of the movable frame between the stowed and deployed positions.

8. A step assembly for providing ingress to and egress from a utility vehicle, the step assembly comprising:

a movable frame configured to be movable relative to the utility vehicle between a stowed position and a deployed position, the movable frame supporting a plurality of steps;

a first actuation lever configured to be accessible by the operator from the ground, the first actuation lever further configured to unlock the frame to allow movement between the stowed and deployed positions; and a second actuation lever configured to be accessible by the operator from the utility vehicle, the second actuation lever also further configured to unlock the frame to allow the movement between the stowed and deployed positions.

9. The step assembly of claim 8, wherein the first actuation lever is configured as a two-way actuation lever for unlocking the movable frame when the first actuation lever is moved in a first direction and a second direction, and wherein the second actuation lever is also configured as a two-way actuation lever for unlocking the movable frame when the second actuation lever is moved in a third direction and a fourth direction.

10. The step assembly of claim 9, wherein movement of the first actuation lever in the first direction is operable to unlock the movable frame from the stowed position, wherein movement of the first actuation lever in the second direction is operable to unlock the movable frame from the deployed position, wherein movement of the second actuation lever in the third direction is also operable to unlock the movable frame from the stowed position, and wherein movement of the second actuation lever in the fourth direction is also operable to unlock the movable frame from the deployed position.

11. The step assembly of claim 9, wherein the first direction is opposite the second direction and wherein the third direction is opposite the fourth direction.

12. The step assembly of claim 8, further comprising:

a latch configured to selectively lock the movable frame in the stowed position and the deployed position, wherein the first and second actuation levers are each operatively coupled to the latch and configured to unlock the movable frame from the stowed position to allow movement of the movable frame towards the deployed position, and configured to unlock the movable frame from the deployed position to allow movement of the movable frame towards the stowed position; and a hinge coupled to the movable frame for allowing movement of the movable frame between the stowed and deployed positions.

13. The step assembly of claim 8, wherein the movable frame includes a first distal end and a second distal end with the plurality of steps disposed in series between the first distal end and the second distal end, wherein the first actuation lever defines a first grip portion and the second actuation lever defines a second grip portion, wherein the first grip portion is disposed closer to the first distal end than the second grip portion, and wherein the second grip portion is disposed closer to the second distal end than the first grip portion.

14. A utility vehicle having a step assembly for providing ingress to and egress from the utility vehicle, the utility vehicle comprising:

a chassis;

a movable frame supporting a plurality of steps, the movable frame configured to be movable relative to the chassis between a stowed position and a deployed position;

a latch configured to selectively lock the movable frame in the stowed position and the deployed position; and an actuation lever operatively coupled to the latch and configured to unlock the movable frame from the stowed position to allow movement of the movable frame towards the deployed position, and configured to unlock the movable frame from the deployed position to allow movement of the movable frame towards the stowed position.

15. The utility vehicle of claim 14, wherein the actuation lever is movable in a first direction and a second direction different from the first direction, wherein movement of the actuation lever in both the first and second directions is operable to unlock the movable frame.

16. The utility vehicle of claim 15, wherein movement of the actuation lever in the first direction is operable to unlock the movable frame from the stowed position, and wherein movement of the actuation lever in the second direction is operable to unlock the movable frame from the deployed position.

17. The utility vehicle of claim 15, wherein the first direction is opposite the second direction.

18. The utility vehicle of claim 14, wherein the latch further comprises:

a lock pin configured to selectively lock the movable frame in the stowed position and the deployed position; and a rotatable crank operatively coupled between the lock pin and the actuation lever to move the lock pin in response to movement of the actuation lever.

19. The utility vehicle of claim 18, further comprising:

a first guide protrusion and a second guide protrusion each configured to move by actuation of the actuation lever, wherein the actuation lever is movable in a first direction and a second direction opposite the first direction, wherein the first guide protrusion is configured to engage the rotatable crank when the actuation lever is moved in the first direction and the second guide protrusion is configured to engage the rotatable crank when the actuation lever is moved in the second direction, wherein the first and second guide protrusions both are configured to rotate the rotatable crank in the same rotational direction for unlocking the lock pin.

20. The utility vehicle of claim 14, further comprising a hinge coupled to the movable frame for allowing movement of the movable frame between the stowed and deployed positions.

* * * * *